(12) United States Patent
Uno et al.

(10) Patent No.: US 6,549,352 B1
(45) Date of Patent: Apr. 15, 2003

(54) SIGNAL PROCESSING APPARATUS UTILIZING A PARTIAL RESPONSE METHOD, AND SIGNAL PROCESSING METHOD, INFORMATION RECORDING APPARATUS, AND INFORMATION REPRODUCTION APPARATUS THEREFORE

(75) Inventors: Hiroshi Uno, Kawasaki (JP); Kiichiro Kasai, Kawasaki (JP); Nobuyoshi Yamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/440,822

(22) Filed: Nov. 15, 1999

(30) Foreign Application Priority Data

Nov. 18, 1998 (JP) .......................... 10-328446

(51) Int. Cl.$^7$ ............................. G11B 5/09
(52) U.S. Cl. ..................... 360/46; 360/65; 375/232
(58) Field of Search ............... 360/41, 65, 46, 360/32, 51, 45; 375/232, 230, 229, 262, 341; 708/323, 322; 341/59

(56) References Cited

U.S. PATENT DOCUMENTS

| | | | | |
|---|---|---|---|---|
| 5,539,588 A | * | 7/1996 | Sawaguchi et al. | 360/65 |
| 5,737,141 A | * | 4/1998 | Hardwick et al. | 360/65 |
| 6,249,398 B1 | * | 6/2001 | Fisher et al. | 360/65 |

FOREIGN PATENT DOCUMENTS

| | | |
|---|---|---|
| JP | 4177603 | 6/1992 |
| JP | 4355268 | 12/1992 |

* cited by examiner

*Primary Examiner*—Alan T. Faber
(74) *Attorney, Agent, or Firm*—Greer, Burns & Crain, Ltd.

(57) ABSTRACT

A signal processing apparatus in which a signal is processed using a partial response method is provided. The apparatus includes a signal processing unit which performs an operation (1−D) on each bit of an input code, where D indicates a delay of one bit; an equalizing unit which equalizes a bit sequence processed by the signal processing unit to a Nyquist characteristic; and a maximum likelihood detection unit which detects a maximum likelihood bit sequence from the bit sequence equalized by the equalizing unit. The input code of the signal processing unit is a 1/7-conversion RLL code of input data.

13 Claims, 9 Drawing Sheets

FIG. 1 PRIOR ART

FIG.2 PRIOR ART (1+D) TRANSFER CHARACTERISTIC

|      | n−1 | n |
|------|-----|---|
| Late | 1   | 1 |
| Non  | 0   | 1 |

WRITE COMPENSATION ALGORITHM

HEAD · MEDIUM TRANSFER
CHARACTERISTIC

FIG.7

EQUALIZER TRANSFER CHARACTERISTIC

FIG.8

Cosine roll-off CHARACTERISTIC

SIGNAL PROCESSING APPARATUS UTILIZING A PARTIAL RESPONSE METHOD, AND SIGNAL PROCESSING METHOD, INFORMATION RECORDING APPARATUS, AND INFORMATION REPRODUCTION APPARATUS THEREFORE

BACKGROUND OF THE INVENTION

1. Field of the Invention

The present invention generally relates to a signal processing apparatus, a signal processing method therefor, an information recording apparatus and an information reproduction apparatus, and more particularly to a signal processing apparatus, a signal processing method therefor, an information recording apparatus and an information reproduction apparatus in which a partial response method is used.

2. Description of the Related Art

Recently, a recording density of magnetic disks is increasing rapidly. This is because both high-sensitive MR (magneto-resistive effect) heads and a PR4ML (a partial response class 4 and a maximum likelihood detection) method are introduced into the magnetic disk drives.

Figure 1:
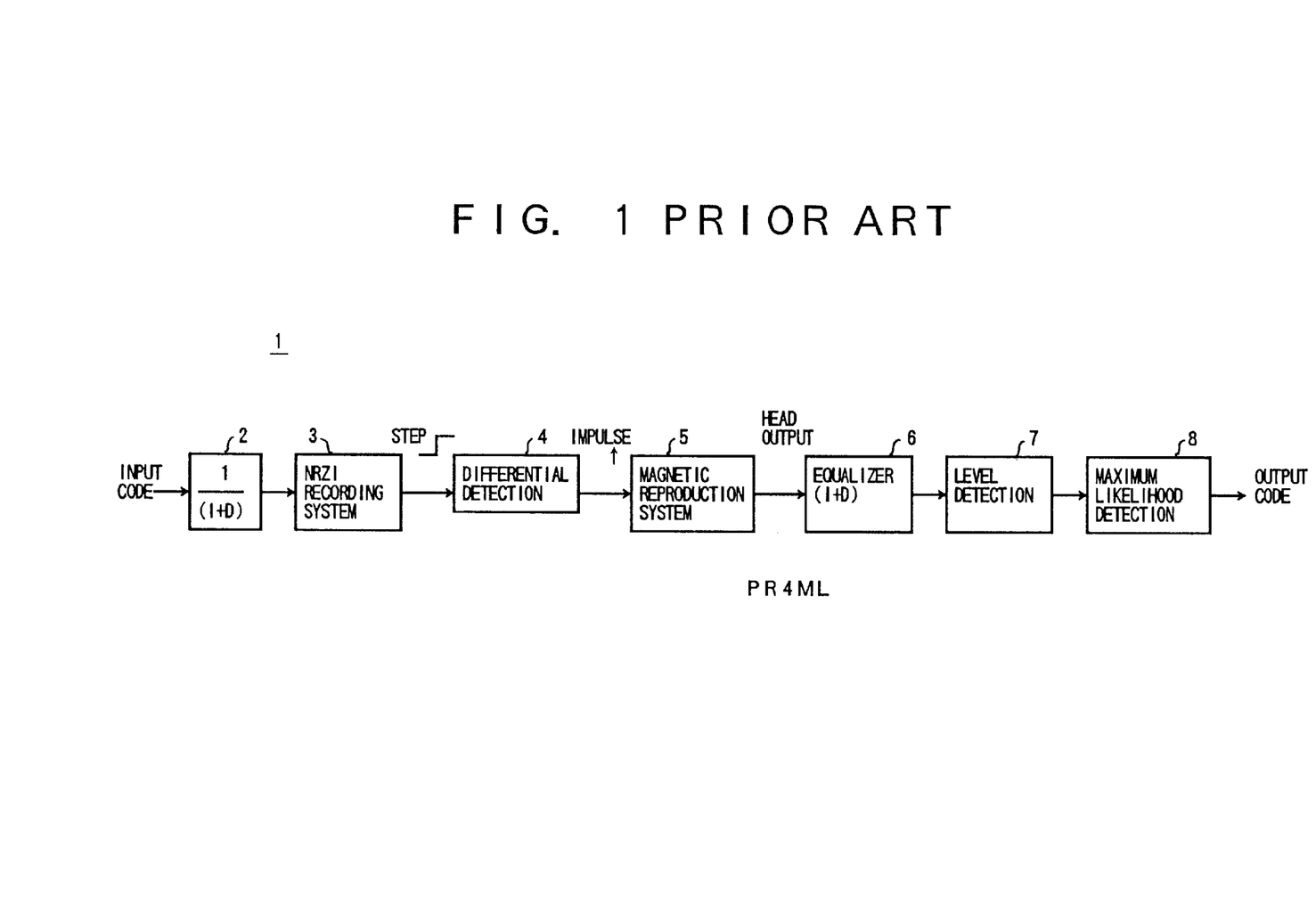
FIG. 1 shows a block diagram of a signal processing circuit of one example according to the prior art.

FIG. 1 shows a block diagram of a signal processing circuit of one example according to the prior art.

A signal processing circuit 1 comprises a pre-coder 2, an NRZI (non-return-to-zero interleave) recording system 3, a differential detection block 4, a magnetic reproduction system 5, an equalizer 6, a level detection block 7 and a maximum likelihood detection block 8.

An 8/9-conversion RLL (Run Length Limited) code is supplied to the pre-coder 2 as an input code. The input code is pre-coded by the pre-coder 2 according to 1/(1+D), where D indicates a one-bit delay.

The pre-coded code is converted into an NRZI-code by the NRZI recording system 3 and the NRZI-code is recorded on a magnetic disk with a step-shaped recording current. A recorded step-shaped signal is differentially detected by a read head in the differential detection block 4. Thus, an impulse waveform of the recorded signal is detected by the differential detection block 4.

The output impulse waveform from the differential detection block 4 is amplified and noise components are removed from the impulse waveform by the magnetic reproduction system 5.

Then, an operation is performed on an output signal from the magnetic reproduction system 5 by the equalizer 6 according to (1+D), where D indicates a one-bit delay.

The level detection block 7 generates a ternary-level signal from the output signal of the equalizer. The maximum likelihood detection block 8 corrects errors in the ternary-level signal.

FIG. 1 shows a block diagram of a PR4ML method. An operation is performed on a bit sequence of the input code according to 1/(1+D)×(1+D), where D indicates a one-bit delay, according to the partial response method. The noise components are also reduced by the term (1+D) of the equalizer 6. Next, the ternary-level signal is generated from an output signal of the equalizer 6 by the level detection block 7. Then, the maximum likelihood detection block 8 corrects errors caused by the noise components remaining in the ternary-level signal with a Viterbi algorithm.

Figure 2:
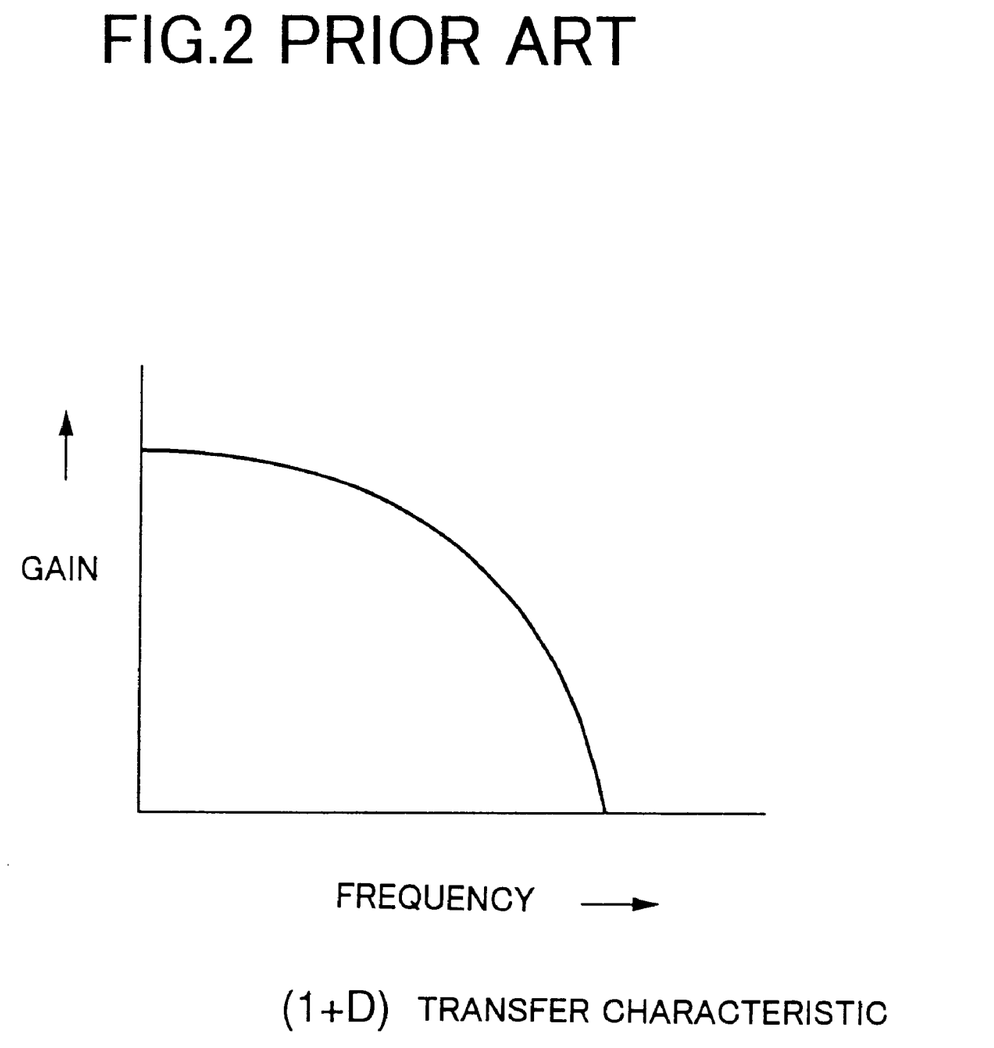
FIG. 2 shows a transfer characteristic of (1+D)

FIG. 2 shows a transfer characteristic of the term (1+D) used in the PR4ML method. A high-frequency noise component is reduced because the transfer characteristic of (1+D) is a low-pass filter. Therefore, a signal-to-noise ratio of the output signal from the equalizer 6 is increased.

As mentioned above, the 8/9-conversion RLL code is employed as the input code in the signal processing circuit 1 shown in FIG. 1 together with the PR4ML method.

However, a recording frequency for recording the 8/9-conversion RLL code used in this signal processing circuit 1 with the PR4ML method is higher than that of a 1/7-conversion RLL code under the condition that the same recording density is achieved by both codes. As the recording frequency increases, the distortion of a recording waveform also increases. This distortion causes a bit shift (NLTS, Non Linear Transition Shift) of reproduced data. Therefore, this causes a problem that an error rate of the reproduced data is increased.

On the other hand, a 1/7-conversion RLL code may be used in a system together with a peak detection method. Therefore, it is possible to lower the recording frequency of the system using the 1/7-conversion RLL code together with the peak detection method below that of the system using the 8/9-conversion RLL code together with the PR4ML method. However, it is very hard to employ a maximum likelihood decoding circuit because whether a signal exists in a time window or not is only detected by the system using the peak detection method.

SUMMARY OF THE INVENTION

It is a general object of the present invention to provide a signal processing apparatus and a signal processing method therefor, an information recording apparatus and an information reproduction apparatus in which the above disadvantages are eliminated.

A more specific object of the present invention is to provide a signal processing apparatus, a signal processing method therefor, an information recording apparatus and an information reproduction apparatus in which a low recording frequency, a reduced distortion of a waveform of a recording current and a reduced NLTS (Non Linear Transition Shift) are achieved and an error rate of a reproduced signal is reduced by a maximum likelihood decoding method.

The above objects of the present invention are achieved by a signal processing apparatus in which a signal is processed using a partial response method. The apparatus comprises a signal processing unit which performs an operation (1−D) on each bit of an input code, where D indicates a delay of one bit; an equalizing unit which equalizes a bit sequence processed by the signal processing unit to a Nyquist characteristic; and a maximum likelihood detection unit which detects a maximum likelihood bit sequence from the bit sequence equalized by the equalizing unit. The input code of the signal processing unit is a 1/7-conversion RLL code of input data.

According to the invention, an error rate of a signal reproduced by the signal processing apparatus can be reduced by a maximum likelihood decoding method using a partial response method.

Furthermore, according to the invention, a low recording frequency, a reduced distortion of a waveform of a recording current and a reduced NLTS are achieved by using the 1/7-conversion RLL code. This also leads to a reduction of an error rate of the reproduced signal.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 3:
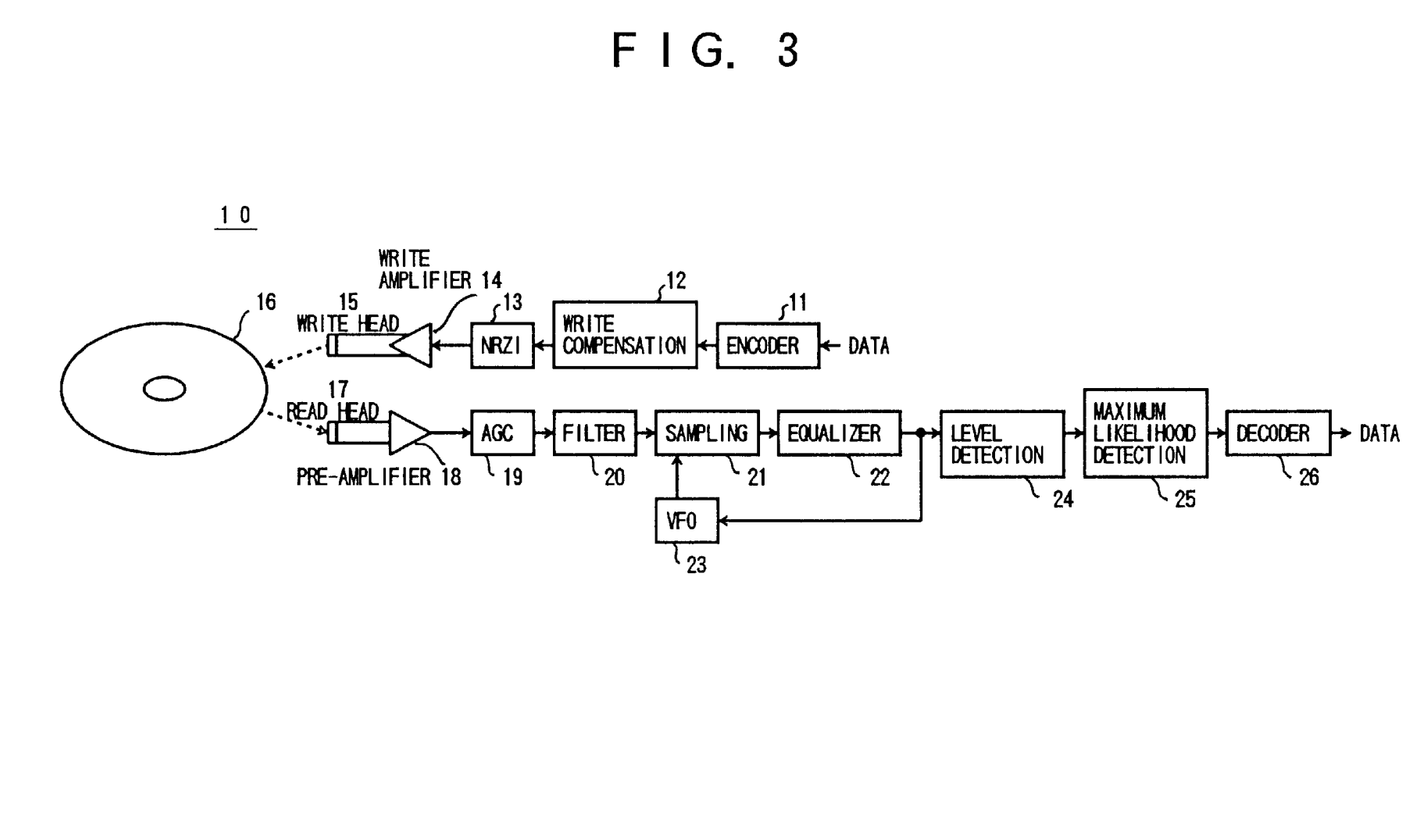
FIG. 3 shows a block diagram of an embodiment according to the present invention.

FIG. 3 shows a block diagram of an embodiment according to the present invention. In this embodiment, a hard disk drive is described as a signal processing apparatus of the embodiment of the present invention.

The hard disk drive 10 of the embodiment of the present invention comprises an encoder 11, a write compensation circuit 12, an NRZI encoding circuit 13, a write amplifier 14, a write head 15, a magnetic disk 16, a read head 17, a pre-amplifier 18, an AGC (automatic gain control) circuit 19, a filter 20, a sampling circuit 21, an equalizer 22, a VFO (voltage frequency oscillator) 23, a level detection circuit 24, a maximum likelihood detection circuit 25 and a decoder 26.

Input data is encoded into a 1/7 RLL code by the encoder 11. The encoded data from the encoder 11 is supplied to the write compensation circuit 12.

A bit in the encoded data from the encoder 11 is selected based on a predetermined pattern by the write compensation circuit 12. Then, a position of the bit is slightly shifted in order to compensate an NLTS (a non-linear shift) by the write compensation circuit 12.

Figure 4:
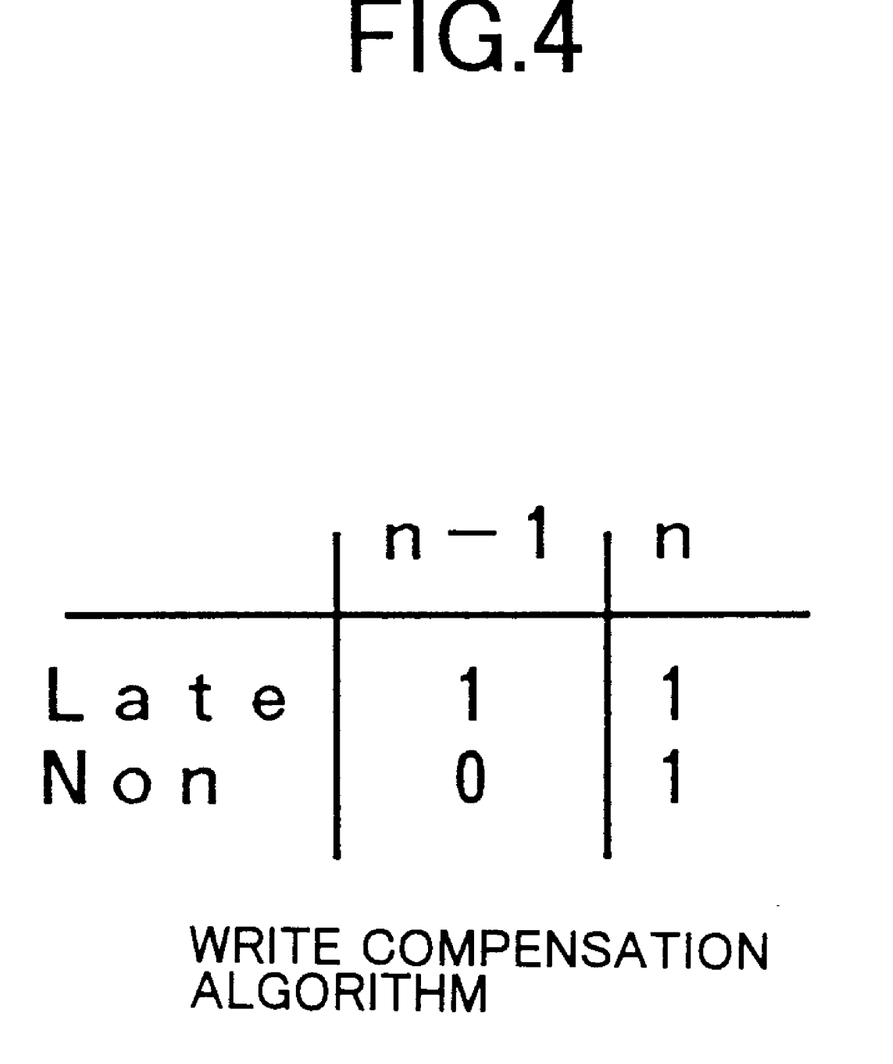
FIG. 4 shows a write compensation algorithm of a write compensation circuit of the embodiment according to the present invention.

FIG. 4 shows a write compensation algorithm of the write compensation circuit 12 of the embodiment according to the present invention.

If a prior bit (n−1) is equal to "1" (one), then a position of a subsequent bit (n) is delayed from a regular position by $\Delta\tau$. On the other hand, if a prior bit (n−1) is equal to "0" (zero), then a position of a subsequent bit (n) is not delayed and the subsequent bit (n) is recorded at a regular position on the magnetic disk. A forward shift (NLTS) of a magnetization inversion of the subsequent bit (n) caused by a magnetization inversion of the prior bit (n−1) can be compensated. It is possible to compensate a forward shift of the magnetization inversion of the concerned bit (n) caused by a magnetization inversion of the two or more prior bits. However, it is needed to reduce a compensation value $\Delta\tau$ according to a distance between the prior bit and the concerned bit (n).

In this embodiment of the present invention, because a 1/7-conversion RLL code is used in the hard disk drive together with a (1−D)-PRML method, it is possible to lower the recording frequency of the input code below that of a hard disk drive using an 8/9-conversion RLL code together with the PR4ML method. Therefore, it is possible to lower the NLTS value. An output bit stream which is an RZ (return to zero) code from the write compensation circuit 12 is supplied to the NRZI encoder 13.

The RZ code supplied from the write compensation circuit 12 is converted into NRZI (non-return-to-zero interleave) code by the NRZI encoder 13. Then, the NRZI code is supplied to the write amplifier 14. The NRZI encoder 13 includes one flip-flop.

The NRZI code supplied from the NRZI encoder 13 is amplified by the write amplifier 14. Then, the amplified NRZI code is supplied to the write head 15. The write head 15 generates a magnetic field according to the amplified NRZI code and magnetizes the magnetic disk 16.

In the NRZI encoder 13, an operation is performed on the input code from the write compensation circuit 12 according to $1/(1-D) \times (1-D)$, and then the processed code is supplied to the write amplifier 14.

A recorded signal on the hard disk 16 is read by the read head 17. A magnetization state of the magnetic disk 16 is differentiated by the read head 17. Therefore, data magnetically recorded on the magnetic disk 16 with a step-shaped recording current is differentiated by the read head 17. The read head 17 outputs an impulse. This impulse from the read heed 17 has a shape according to a transfer characteristic of a recording medium. This shape is known as Lorentz approximation.

An output signal from the read head 17 is supplied to the pre-amplifier 18 and then amplified. An output signal from the pre-amplifier 18 is supplied to the AGC circuit 19. The AGC circuit 19 controls an amplitude of an output signal of the AGC circuit 19 to be constant. The output signal of the AGC circuit 19 is supplied to the filter 20.

The filter 20 is a low pass-filter. The filter 20 removes undesired noise components from the output signal of the AGC circuit 19. It is possible to construct the filter 20 as a part of the equalizer 22. An output signal from the filter 20 is supplied to the sampling circuit 21.

The output signal from the filter 20 is digitized by the sampling circuit 21 using a sample and hold circuit, an A/D converter and a clock signal supplied from the VFO 23. A frequency of the clock signal supplied from the VFO 23 is assumed to be a frequency twice the Nyquist frequency fn.

The VFO 23 generates a clock signal which is synchronized with a reproduced signal from the magnetic disk 16. The VFO 23 has a phase comparator based on so-called "Dolivo theory" (Japanese Laid-Open Patent Application No. 1-143447). The sampled signal by the sampling circuit 21 according to the clock signal from the VFO 23 is supplied to the equalizer 22.

The output signal from the sampling circuit 21 is equalized by the equalizer 22 to match a predetermined transfer characteristic. The equalizer 22 can be formed by an adaptive transversal filter which can adapt the reproduced signal. An output signal of the equalizer 22 is supplied to the level detection circuit 24.

The level detection circuit 24 comprises a voltage comparator. The voltage comparator compares the output signal from the equalizer 22 with two slice levels which vary to trace fluctuations of a peak level of the output signal from the equalizer 22. Then, the level detection circuit 24 outputs a signal which has ternary levels "+1", "0" and "−1".

The ternary-level signal detected by the level detection circuit 24 is supplied to the maximum likelihood detection circuit 25. The maximum likelihood detection circuit 25 comprises a path memory and a decision circuit. The path memory stores two candidate paths of the ternary-level signal. The decision circuit judges a correct path out of the two candidate paths based on the fact that a positive transition of the reproduced signal and a negative transition of it emerge alternatively, and outputs a code sequence.

The maximum likelihood detection method comprises the level detection circuit 24, and the maximum likelihood detection circuit 25 described above is called a simple Viterbi algorithm. In the simple Viterbi algorithm, a maximum likelihood detection is done based on the criteria that a reproduced signal having a higher level and an alternative transition between a positive edge and a negative edge is correct.

It is also possible to employ a Viterbi algorithm in which a correct path is judged based on a criteria that a path having a smaller mean square error is correct.

A decoded code from the maximum likelihood detection circuit 25 is supplied to the decoder 26. The decoded code is a 1/7-conversion RLL code. The 1/7-conversion RLL code is decoded to data by the decoder 26, which data is the same data as supplied to the encoder 11.

Figure 5:
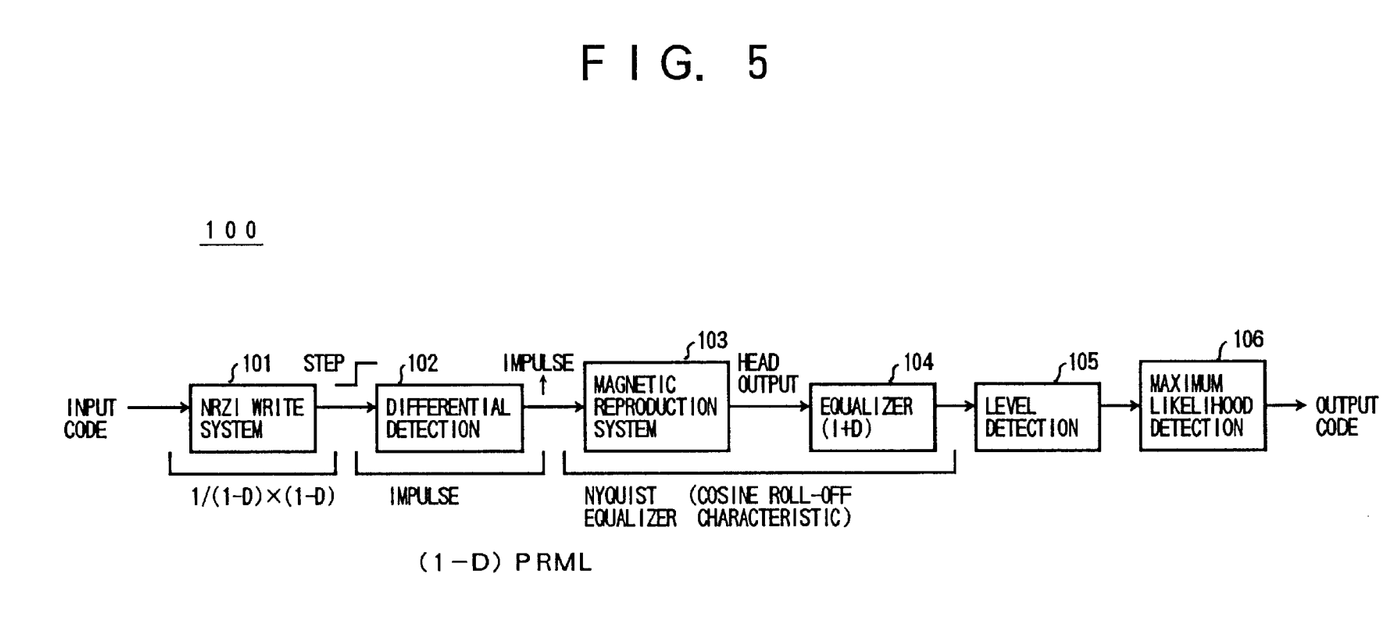
FIG. 5 shows an equivalent block diagram of the embodiment according to the present invention.

FIG. 5 shows an equivalent block diagram of the embodiment according to the present invention.

FIG. 5 is the equivalent block diagram 100 of the magnetic disk drive 10 shown in FIG. 3. The equivalent block diagram 100 comprises an NRZI recording system 101, a differential detection block 102, a magnetic reproduction system 103, an equalizer 104, a level detection block 105 and a maximum likelihood detection block 106.

The NRZI recording system 101 corresponds to the NRZI-encoding circuit 13, the write amplifier 14, the write head 15, and the magnetic disk 16 shown in FIG. 3.

The NRZI recording system 101 carries out an operation on an input code according to $\{1/(1-D)\} \times (1-D)$, and outputs a step signal.

The step signal is supplied to the differential detection block 102. The differential detection block 102 corresponds to the read head 17 shown in FIG. 3. The step signal is differentiated by the differential detection block 102 and converted into an impulse signal.

The magnetic reproduction system 103 corresponds to the pre-amplifier 18, the AGC circuit 19, the filter 20 and the sampling circuit 21 shown in FIG. 3. The magnetic reproduction system 103 carries out a filtering operation on the impulse signal supplied from the differential detection block 102, and then digitizes it.

The equalizer 104 corresponds to the equalizer 22 shown in FIG. 3. The magnetic reproduction system 103 and the equalizer 104 construct a Nyquist equalizer. A transfer characteristic of the magnetic reproduction system 103 and the equalizer 104 is a cosine roll-off characteristic.

Figure 6:
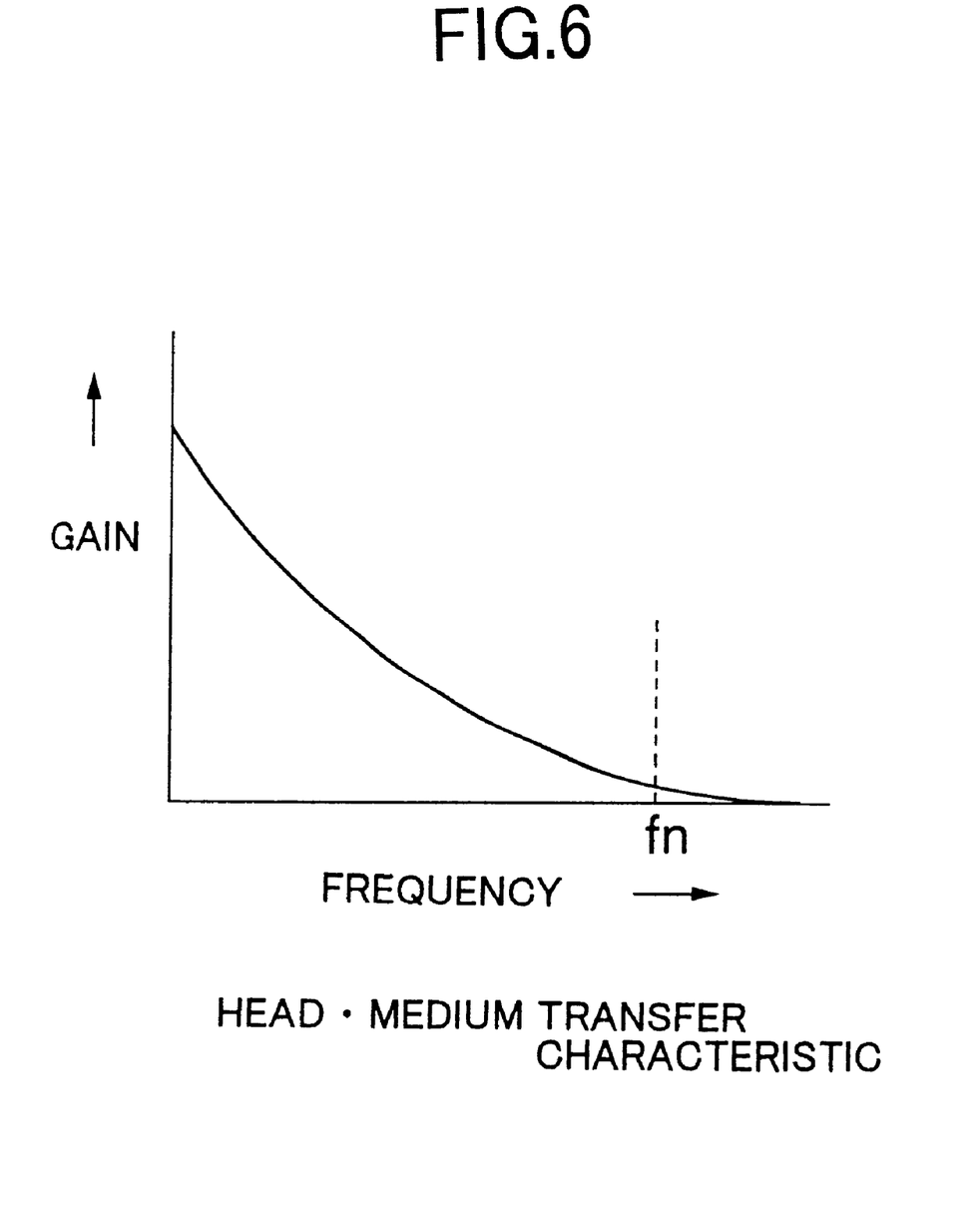
FIG. 6 shows a transfer characteristic of a magnetic reproduction system of the embodiment according to the present invention.
Figure 7:
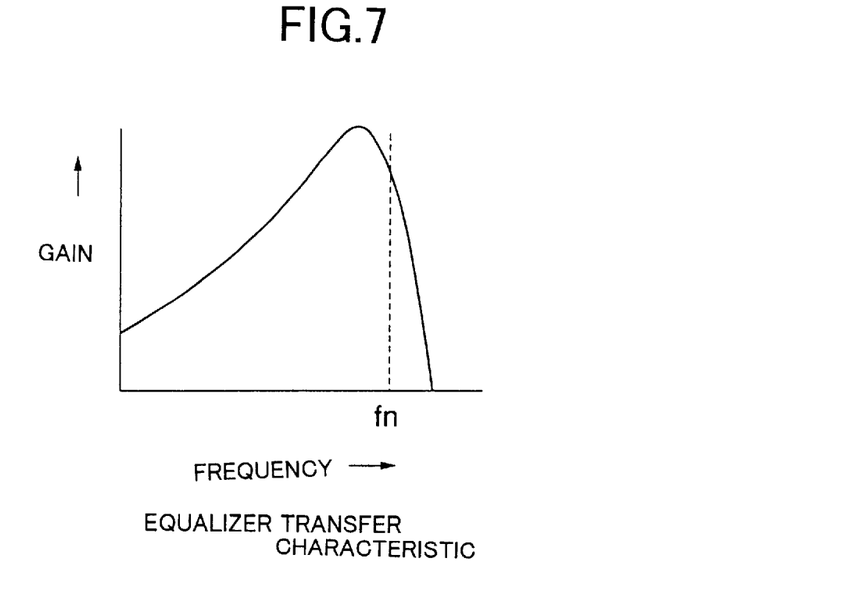
FIG. 7 shows a transfer characteristic of an equalizer of the embodiment according to the present invention.
Figure 8:
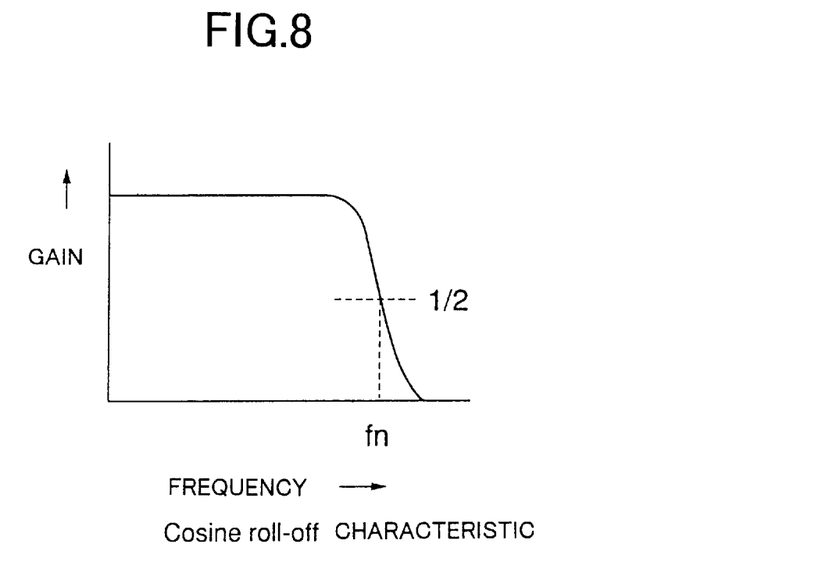
FIG. 8 shows a cosine roll-off characteristic of the embodiment according to the present invention.

FIG. 6 shows a transfer characteristic of the magnetic reproduction system 103 of the embodiment according to the present invention. FIG. 7 shows a transfer characteristic of the equalizer 104 of the embodiment according to the present invention. FIG. 8 shows a cosine roll-off characteristic of the embodiment according to the present invention.

The magnetic reproduction system 103 has the transfer characteristic shown in FIG. 6. The equalizer 104 is set to the transfer characteristic shown in FIG. 7. A product of the transfer characteristic of the magnetic reproduction system 103 and the transfer characteristic of the equalizer 104 has the cosine roll-off characteristic shown in FIG. 8.

An attenuation characteristic of the cosine roll-off characteristic shown in FIG. 8 has a cosine curve and a gain is 0.5 at the Nyquist frequency fn which is a half frequency of a maximum frequency of the input code. This cosine roll-off characteristic leads a ternary-level signal "+1", "0" and "−1" with a regular interval to the output of the equalizer 104. This means that a reproduced hi signal is equalized to the partial response characteristic by the equalizer 104.

This ternary-level signal equalized to the partial response characteristic practically comprises noise components caused by media, heads and amplifiers.

The level detection block 105 detects a level of the ternary-level signal supplied from the equalizer 104. A result of the detection by the level detection block 105 is supplied to the maximum likelihood detection block 106. The maximum likelihood detection block 106 detects maximum-likelihood data from the result of the detection from the level detection block 105.

Next, an operation of the embodiment will be explained.

Figure 9:
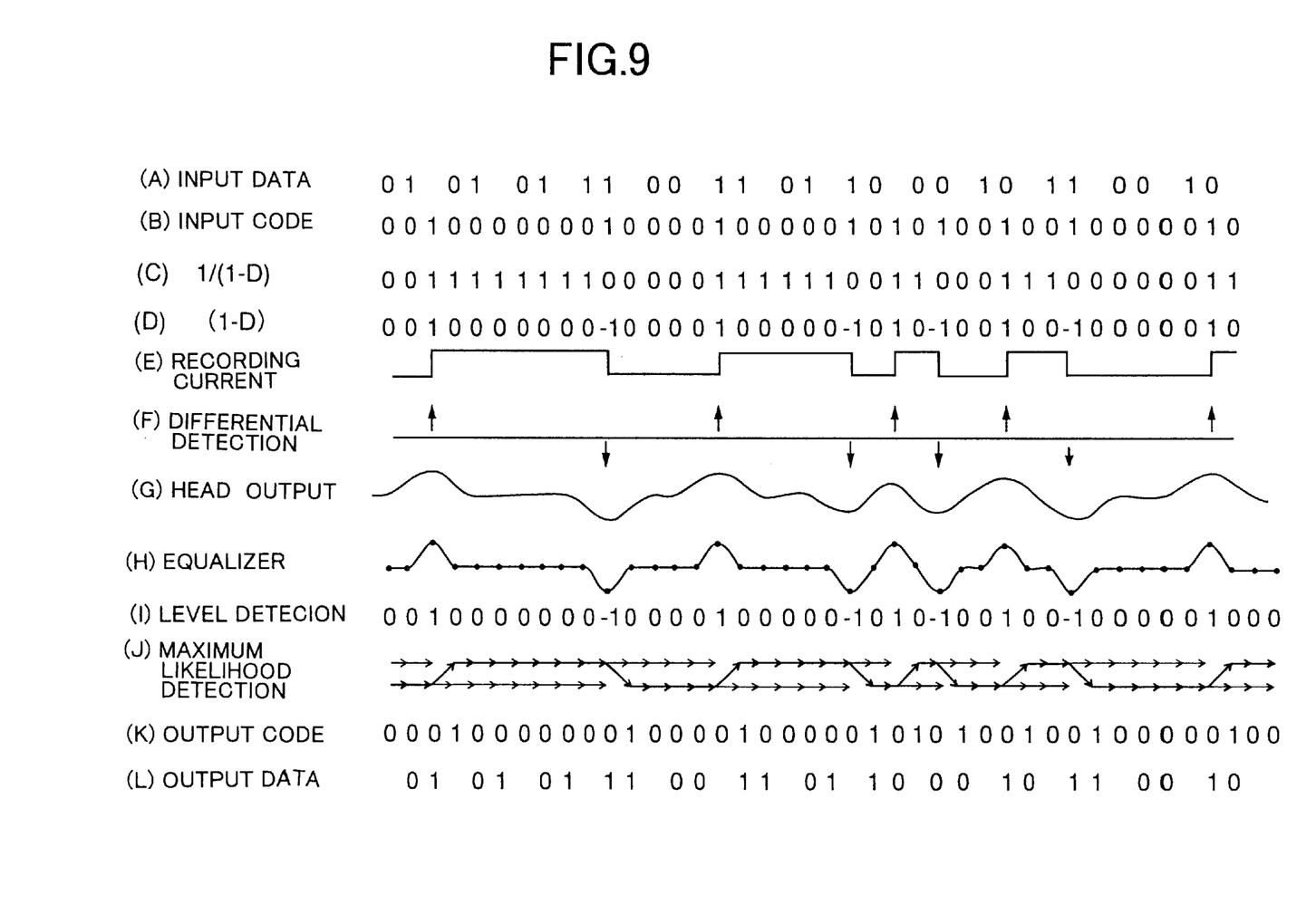
FIG. 9 shows a timing chart of signals of the embodiment according to the present invention.

FIG. 9 shows a timing chart of signals of the embodiment according to the present invention.

FIG. 9(A) shows input data and (B) shows a 1/7-conversion RLL code converted from the input data (A). FIG. 9(C) shows a result of an operation $\{1/(1-D)\}$ on the 1/7-conversion RLL code (B) and (D) shows a result of an operation $(1-D)$ on the result of the operation $\{1/(1-D)\}$ on the 1/7-conversion RLL code. FIG. 9(E) shows a recording current supplied to a write head according to the result of the operation $(1-D)$ and (F) shows a differential waveform of the recording current.

FIG. 9(G) shows an output signal from a read head and (H) shows an output signal of the equalizer 22 in FIG. 3. FIG. 9(I) shows an output signal of the level detection block 24 and (J) shows a process of a maximum likelihood detection by the maximum likelihood detection block 25 in FIG. 3. FIG. 9(K) shows a detected 1/7-conversion RLL code and (L) shows output data recovered from the detected 1/7-conversion RLL code (K).

The input data (A) is converted to a 3-bit 1/7-conversion RLL code (B) for each two bits of the input data (A). The operation $1/(1-D)$ means an exclusive-OR operation between a bit of the input code and a bit which is a result of the operation $1/(1-D)$ just before the current operation. The operation $(1-D)$ is an operation to subtract a bit of a prior result of the operation $1/(1-D)$ from a bit of a present result of the operation $1/(1-D)$.

The operations $1/(1-D)$ and $(1-D)$ are performed by a flip-flop in the NRZI encoder 13 in FIG. 3. The write amplifier 14 in FIG. 3 drives the write head 15 according to the output of the NRZI encoder 13. A direction of a recording current through the write head 15 is inverted by the write amplifier 14 according to levels "+1" and "−1" of the output signal from the NRZI encoder 13.

An impulse response waveform as shown in FIG. 9(G) is output from the read head 17. The impulse waveform shown in FIG. 9(F) is band-limited according to a transfer characteristic between the magnetic disk 16 and the read head 17. Then the band-limited impulse signal is output from the read head 17.

The equalizer is constructed, for example, using a 10-tap finite impulse response (FIR) filter. The characteristic of the equalizer 22 is adjusted in order to get a waveform which meets the Nyquist characteristic at the output of the equalizer 22. Each tap gain of the FIR filter is adjusted according to a difference value between a sampled signal at the output of the equalizer and ternary-levels "+1", "0" and "−1". This adjustment procedure is repeated until the sampled signal at the output of the equalizer meets the Nyquist characteristic. An equalizer having this adjustment function is called an adaptive equalizer and the adaptive method is known as a steepest ascent or descent method.

As a result, a total transfer characteristic from the read head 17 to the equalizer 22 is adjusted to a cosine roll-off characteristic. Therefore, a voltage of a signal from the equalizer 22 at the sampling time shown in FIG. 9(H) becomes "1", "0" or "−1" as shown by "·" (dots).

FIG. 9(J) shows a process of a maximum likelihood detection by the maximum likelihood detection block 25 in FIG. 3. The maximum likelihood detection block 25 discards a path written with a thin line and stores new paths every time a correct path written with a bold line is selected as shown in FIG. 9(J). Then, detected data as shown in FIG. 9(K) is output from the maximum likelihood detection block 25. Errors caused by a noise signal can be corrected by the maximum likelihood detection block 25.

Figure 10:
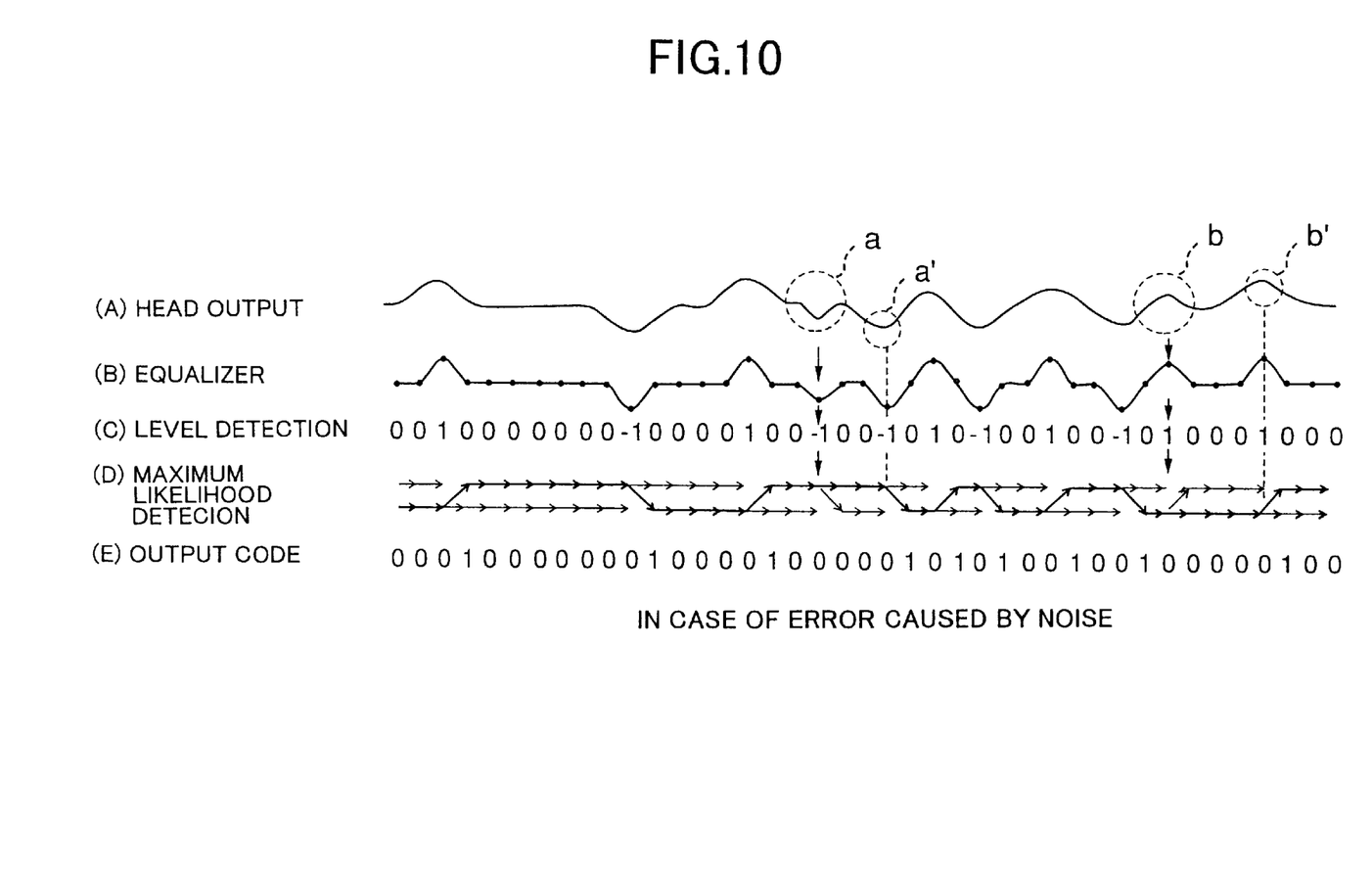
FIG. 10 shows an operation of a maximum likelihood detection block of the embodiment of the present invention.

FIG. 10 shows an operation of the maximum likelihood detection block 25 of the embodiment of the present invention when errors are caused by noises. FIG. 10(A) shows an output signal from the read head 17. FIG. 10(B) shows an equalized signal by the equalizer 22. FIG. 10(C) shows a detected signal by the level detector 24. FIG. 10(D) shows a process of the maximum likelihood detection and FIG. 10(E) shows an output code detected by the maximum likelihood detection block 25.

In FIG. 10(A), "a" and "b" shows fluctuations of the output signal from the read head 17 caused by noises. The fluctuation "a" results in a mis-detection of a level "−1" instead of "0". On the other hand, the fluctuation "b" results in a mis-detection of a level "+1" instead of "0".

However, when the output signal becomes "−1" at a point in time "a'", the mis-detected level "−1" at the time point "a" is corrected to "0". Similarly, when the output signal becomes "+1" at a point in time "b'", the mis-detected level "+1" at a point in time "b" is corrected to "0". As a result, the errors caused by the noises are corrected as described above.

The error-corrected output code which is a 1/7-conversion RLL code is supplied to the decoder 26 and output data is recovered by the decoder 26.

If a DC component in an input code supplied to the encoder 11 in FIG. 3 causes a problem, a scrambler for randomizing the input data may be provided at the input of the encoder 11. In case that the scrambler is provided, a de-scrambler for recovering data is also provided at the output of the decoder 26.

A difference between a recording system in a signal processing apparatus which uses a peak detection method and a recording system in the signal processing apparatus using a partial response signal processing method of the embodiment is only a write compensation algorithm. The former uses a pattern effect compensation type, while the latter uses a non-linear distortion (NLTS) compensation type. Even if data is recorded on a recording medium without write compensation or with slight write compensation, it is possible to reproduce data with a low error rate and high reliability by the partial response signal processing method of the embodiment according to the present invention.

As described above, a signal processing apparatus using the partial response method enables a low recording frequency, a reduced distortion of a waveform of a recording current and a reduced NLTS, and an error rate of a reproduced signal is reduced by a maximum likelihood decoding method.

Furthermore, the maximum likelihood detection of a ternary-level signal improves an error rate of detected data equal to about 3 dB improvement of a signal-to-noise ratio. Therefore, it is possible to raise a recording density above that of a signal processing apparatus using a peak detection method.

In the embodiment described above, both the write head and the read head are used in the signal processing circuit. However, it is possible to use a head which can write data to and read data from a magnetic disk.

In the embodiment described above, a reproduced signal is digitized by the sampling circuit. However, it is possible to construct a signal processing circuit with an analog circuit.

In the embodiment described above, a 1/7-conversion RLL code is used in the signal processing circuit. However, it is possible to use other types of codes.

Furthermore, it is possible to read data with high reliability from, for example, a floppy disk in which data is recorded after an operation (1−D) is performed, using a reproduction system which is described in the embodiment of the present invention.

The present invention is not limited to the specifically disclosed embodiment, and variations and modifications may be made without departing from the scope of the present invention.

The present application is based on Japanese priority application No. 10-328446 filed on Nov. 18, 1998, the entire contents of which are hereby incorporated for reference.

What is claimed is:

1. A signal processing apparatus in which a signal is processed using a partial response method, the apparatus comprising:
   a signal processing unit which performs an operation (1−D) on each bit of an input code, where D indicates a delay of one bit; and
   an equalizing unit which equalizes a bit sequence processed by said signal processing unit to a Nyquist characteristic.

2. The signal processing apparatus as claimed in claim 1, further comprising:
   a maximum likelihood detection unit which detects a maximum likelihood bit sequence from the bit sequence equalized by said equalizing unit.

3. The signal processing apparatus as claimed in claim 1, wherein said input code of said signal processing unit is a 1/7-conversion RLL code converted from input data.

4. The signal processing apparatus as claimed in claim 2, wherein said input code of said signal processing unit is a 1/7-conversion RLL code converted from input data.

5. A signal processing method in which a signal is processed using a partial response method, the method comprising:
   a signal processing step of performing an operation (1−D) on each bit of an input code, where D indicates a delay of one bit; and
   an equalizing step of equalizing a bit sequence processed by said signal processing step to a Nyquist characteristic.

6. The signal processing method as claimed in claim 5, the method further comprising:

a maximum likelihood detection step of detecting a maximum likelihood bit sequence from the bit sequence equalized by said equalizing step.

7. The signal processing method as claimed in claim 5, wherein said input code of said signal processing step is a 1/7-conversion RLL code converted from input data.

8. The signal processing method as claimed in claim 6, wherein said input code of said signal processing step is a 1/7-conversion RLL code converted from input data.

9. An information recording apparatus in which a signal recorded onto and reproduced from a recording medium is processed using a partial response method, the apparatus comprising:

an NRZI conversion unit which converts and input code to an NRZI-code;

a recording unit which records said NRZI-code onto said recording medium;

a reproduction unit which reproduces a bit sequence of a code recorded on said recording medium; and an equalizing unit which equalizes the reproduced bit sequence from said reproduction unit to a characteristic, said characteristic and a characteristic of said equalizing unit of said reproduction unit connected in a cascade construct a cosine roll-off characteristic.

10. The information recording apparatus as claimed in claim 9, further comprising:

a maximum likelihood detection unit which detects a maximum likelihood bit sequence from the bit sequence equalized by said equalizing unit.

11. The information recording apparatus as claimed in claim 9, wherein said input code of said NRZI conversion unit is a 1/7-conversion RLL code converted from input data.

12. The information recording apparatus as claimed in claim 10, wherein said input code of said NRZI conversion unit is a 1/7-conversion RLL code converted from input data.

13. An information reproduction apparatus in which an operation (1−D) is performed on an input bit sequence and said processed bit sequence is recorded onto a recording medium, the apparatus comprising:

an equalizing unit which equalizes a signal reproduced from said recording medium to a Nyquist characteristic; and a maximum likelihood detection unit which detects a maximum likelihood bit sequence from the bit sequence equalized by said equalizing unit.

* * * * *